United States Patent
Mu et al.

(10) Patent No.: US 8,204,833 B2
(45) Date of Patent: *Jun. 19, 2012

(54) METHOD FOR FINGERPRINTING AND IDENTIFYING INTERNET USERS

(75) Inventors: Ruicao Mu, Richmond Hill (CA); Tie Hu, Scarborough (CA)

(73) Assignee: Softroute Corporation, Markham, Ontario (CA)

( * ) Notice: Subject to any disclaimer, the term of this patent is extended or adjusted under 35 U.S.C. 154(b) by 406 days.

This patent is subject to a terminal disclaimer.

(21) Appl. No.: 12/473,256

(22) Filed: May 27, 2009

(65) Prior Publication Data

US 2010/0306832 A1    Dec. 2, 2010

(51) Int. Cl.
*G06Q 20/00*    (2012.01)
(52) U.S. Cl. .............................. 705/76; 726/29; 713/186
(58) Field of Classification Search ................. 705/76; 713/186
See application file for complete search history.

(56) References Cited

U.S. PATENT DOCUMENTS

| | | | | |
|---|---|---|---|---|
| 6,122,624 A * | 9/2000 | Tetro et al. | | 705/44 |
| 6,157,825 A * | 12/2000 | Frederick | | 455/410 |
| 7,426,492 B1 * | 9/2008 | Bishop et al. | | 705/39 |
| 8,010,400 B2 * | 8/2011 | Mascarenhas | | 705/7.29 |
| 2002/0099649 A1 * | 7/2002 | Lee et al. | | 705/38 |
| 2002/0194119 A1 * | 12/2002 | Wright et al. | | 705/38 |
| 2006/0048211 A1 * | 3/2006 | Pierson et al. | | 726/3 |
| 2006/0224898 A1 * | 10/2006 | Ahmed | | 713/186 |
| 2007/0094095 A1 * | 4/2007 | Kilby | | 705/26 |
| 2007/0100680 A1 * | 5/2007 | Kumar et al. | | 705/10 |
| 2007/0106582 A1 * | 5/2007 | Baker et al. | | 705/35 |
| 2007/0198361 A1 * | 8/2007 | Ronning et al. | | 705/26 |
| 2007/0239604 A1 * | 10/2007 | O'Connell et al. | | 705/50 |
| 2007/0239606 A1 * | 10/2007 | Eisen | | 705/51 |
| 2008/0113791 A1 * | 5/2008 | Williams et al. | | 463/29 |
| 2008/0275748 A1 * | 11/2008 | John | | 705/7 |
| 2011/0055078 A1 * | 3/2011 | Nandy | | 705/39 |
| 2011/0082768 A1 * | 4/2011 | Eisen | | 705/26.35 |

OTHER PUBLICATIONS

"Security: That PC's a Rogue", The Daily Beast website, Nov. 12, 2006, p. 1, http://www.thedailybeast.com/newsweek/2006/11/12/security-that-pc-s-a-rogue.html.*
Roberts, P., "Authentication gets an upgrade", InfoWorld, all pages, Jul. 24, 2006. http://www.infoworld.com/print/23562.*

* cited by examiner

*Primary Examiner* — Andrew J. Fischer
*Assistant Examiner* — Calvin Cheung
(74) *Attorney, Agent, or Firm* — Tran & Associates

(57) ABSTRACT

Various aspects of the present system provide methods and systems for identifying an individual who operates a remote computer. One aspect provides a technique to generate fingerprint of computer and its user based on the information collected through the actions a user conducts on internet. Another aspect of the system provides a technique to compute the fingerprints and find relations between users and computers. Another aspect of the system provides a trust ranking to a user based on the consistency of information collected from the user's various actions.

17 Claims, 8 Drawing Sheets

FIG. 1 System of Parameters, Fingerprints, and Identifications

FIG. 3A

| Index of parameters | Index of fingerprints |
|---|---|
| user serial number | user serial number |
| source website | source website |
| username | username |
| password | password |
| email | email |
| first name | |
| last name | |
| phone number | phone number |
| fax number | fax number |
| mobile phone number | mobile phone number |
| number on street | |
| street name | |
| city name | |
| state/province | |
| country | |
| postal code | |
| browser type | |
| browser version | |
| browser plugin 1 | |
| browser plugin 2 | |
| browser plugin 3 | |
| browser plugin N | |
| browser IP address | browser IP address |
| browser cookie | browser cookie |
| system time | |

FIG. 3B

| | |
|---|---|
| system language | |
| credit card type | credit card number |
| credit card number | |
| credit card expiry date | |
| first name on card | |
| last name on card | |
| verification code | verification code |
| number on street | |
| street name | |
| city name | |
| state/province | |
| country | |
| postal code | |
| computer CPU serial number | computer CPU serial number |
| computer motherboard serial | computer motherboard serial |
| network card serial number | network card serial number |
| hard disk drive serial number | hard disk drive serial number |
| direct IP address of computer | computer's direct IP address |
| application software 1 | |
| application software 2 | |
| application software 3 | |
| application software N | |

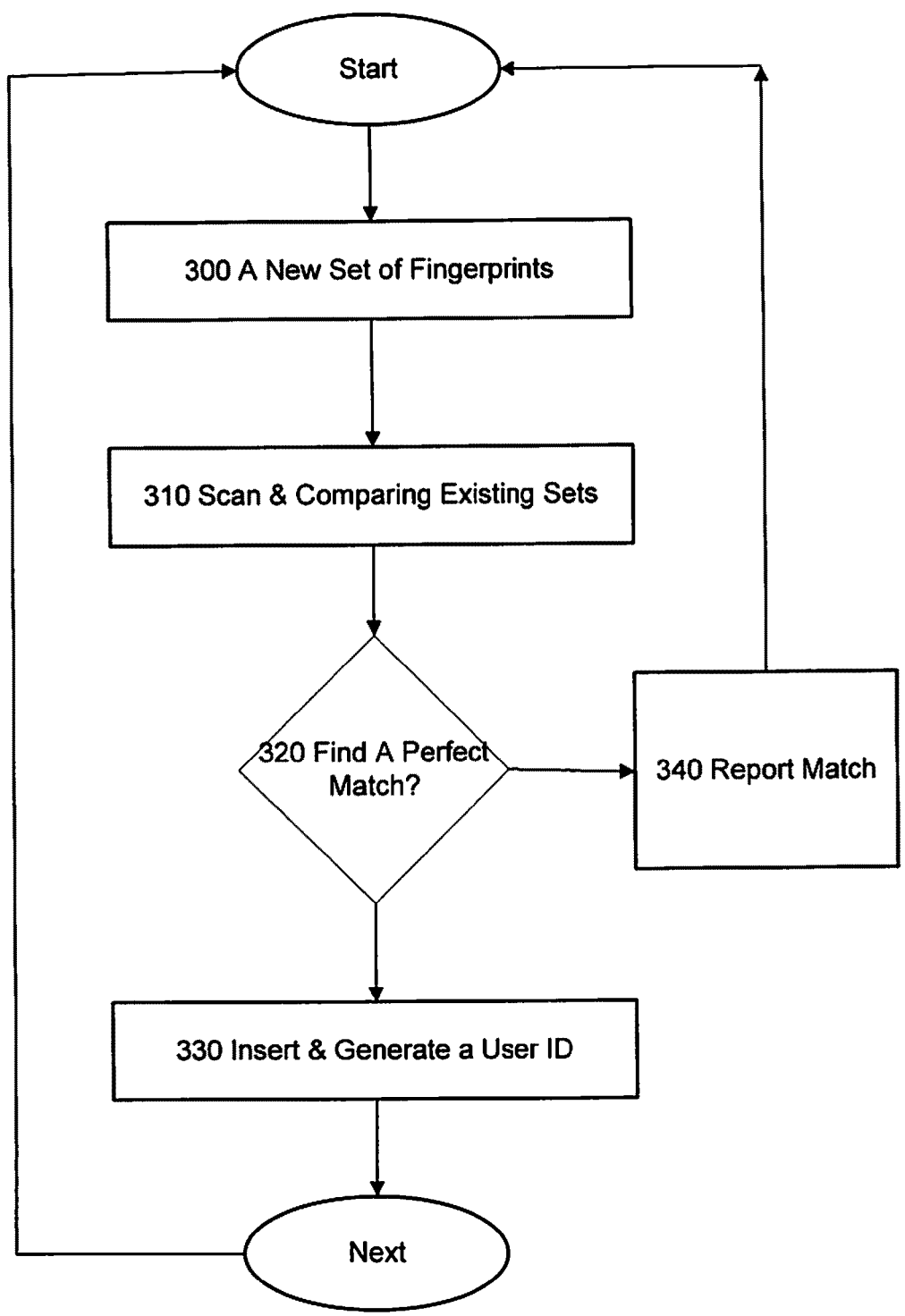
FIG. 4 Establish User ID & Fingerprint Database

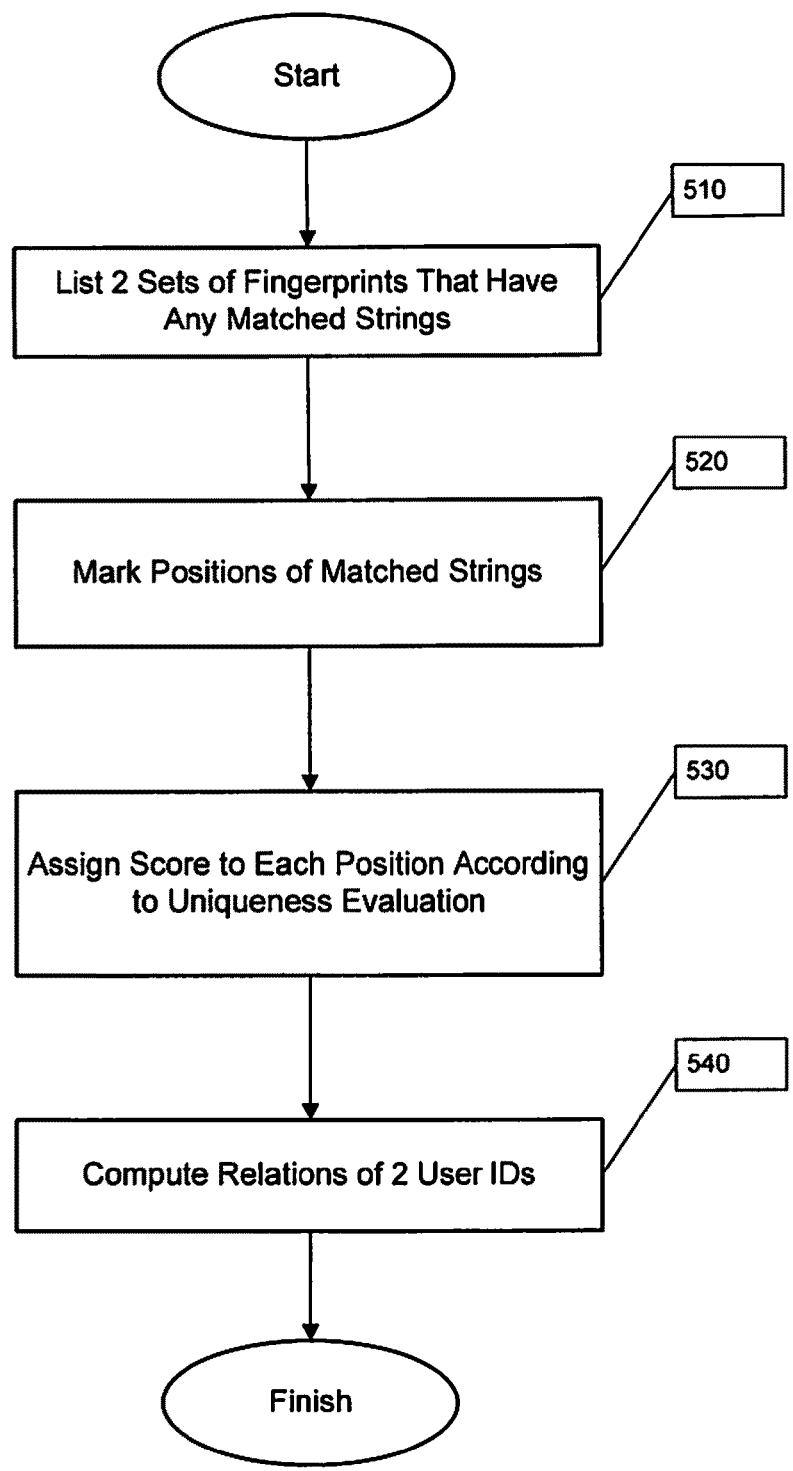
FIG. 5 Compute Relations of Users

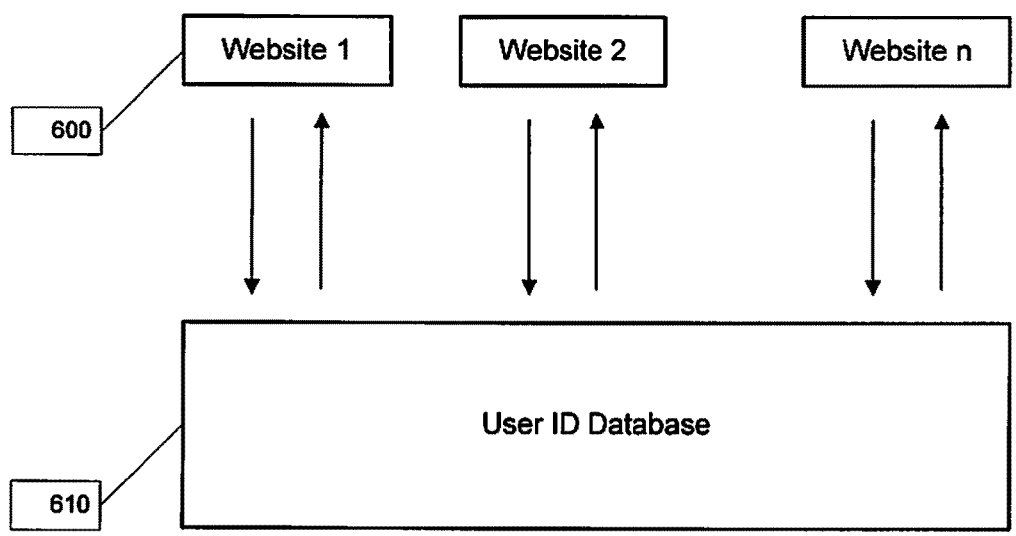
FIG. 6 Fraud Detection & Alert System

METHOD FOR FINGERPRINTING AND IDENTIFYING INTERNET USERS

BACKGROUND

The invention relates generally to fingerprinting a user for identification purposes.

The Internet has become a pervasive platform for electronic commerce where merchants typically sell products or services to their visitors worldwide on the merchants' websites. Products and services are increasingly exchanged online. However, while being a fast media to facilitate transactions, due to anonymity, the internet has also attracted fraudulent activities. By default internet users visit websites anonymously without any trusted identification and such visits leave the online transactions dependent on the information provided by the users. Fraudsters quickly take advantage of this anonymous nature of internet—they steal credit cards, bank accounts by phishing account owners or by direct hacking into the bank or credit card database, then use the credit cards stolen to purchase product or service online. Each year billions of dollars are reportedly lost in a single country by this type of fraudulent transactions, which leads both consumers and merchants to lose money and lose trust to each other. Although user identification is available at its source ISP (Internet Service Provider), in theory the fraudster can be tracked according to logging information (time, computer, IP address among others), the tracking requires enforceable search warrant to the ISP, often located in foreign countries, which is not feasible for the merchants or consumers to acquire. As a result, fraudsters can keep defrauding the same merchants and consumers with impunity.

Efforts have been made by the merchants to detect fraudulent payments by using the information retrieved from each transaction. Such efforts include comparing the country the payer enters with the country the credit card BIN represents and the country of the payer's IP address, comparing the address entered with the address associated with the credit card, email verification, phone verification, among others. These efforts have limited success. First, with millions of credit cards being made available through hacking, fraudsters can access the complete information associated with the credit cards: name, card number, expiry date, verification code, address and phone number, among others. They can enter the information that match information associated with the card, thus easily pass through the check points. Second, the above verifications are primitive and thus limited in securing the credit cards. For instance, information like IP address may not be reliable since the fraudsters can use publicly available web proxy to hide their real IP address, therefore the fraudsters can pretend to be a buyers from USA while they are physically located in Morocco, for example. Third, due to the lack of automated analyzing tools, most merchants organize these check points one by one, and check the items intuitively and manually. As a result, mistakes can be easily made when the transaction volume increases.

Other efforts have been made to detect fraudulent payments by analyzing the buying patterns of the credit card holder, including time of purchase, value of purchased items etc. While there is no predictable buying pattern being developed, this method can help when a big item is purchased, but can't distinguish the abnormal purchase when the purchased items are of smaller or medium value. Also, the detection occurs only after payment, which means the damage has been incurred.

Because the verification process is primitive and often intuitive, the pattern is often too vague to be recognized. As a result, the fraudsters can use the same defrauding technique to attack multiple merchants—they can simply use the same stolen credit card to buy service from different merchants in succession to run up large charges before the credit card is cancelled.

SUMMARY

Various aspects of the present system provide methods and systems for tracing internet actions to a remote computer and to an individual who operates the computer. One aspect provides a technique to generate fingerprint of computer and its user based on the information collected through the actions a user conducts on internet. Another aspect of the system provides a technique to compute the fingerprints and find relations between users and computers. Another aspect of the system provides a trust ranking to a user based on the consistency of information collected from the user's various actions. More aspects of the system can be found in the detailed descriptions with the associated figures hereunder.

In one aspect a method establishes parameters of internet users in a database, and computes the parameters to fingerprint and identify related or unrelated individuals who access the internet and/or worldwide web anonymously. A trust rank is assigned to each identity by cross checking and authenticating parameters, and each parameter is assigned a different weight in computing the relation approximation of two identities. The method is particularly useful in locating some activities, such as fraudulent activities, to one or a number of internet users.

When a person visits somewhere on internet and/or do something on internet, such as browsing a website, downloading a software, registering an account, making a payment etc., that person will leave parameters about himself or herself. While many are non unique, some parameters are unique and are intrinsic traits to a computer and/or an internet user, thus can be used to establish a one to one relation with a remote computer, other parameters are unique enough to characterize persons, thus can be used to establish a one to one relation with an individual. One aspect of the system indexes these unique parameters as fingerprints of computers and fingerprints of people who operate the computers, and establish database of unique user identification based on the set of fingerprint.

The database of user identification with fingerprints can directly link any fingerprints found through user actions to an user, thus provides website operators a way to permit or ban the user. To protect the identity, the fingerprints can be encrypted. Once the user is located, any of his/her fingerprints are located, and any actions of the user that contain such fingerprints can be permitted or banned. Compared to the various existing verification mechanism that analyzes extrinsic information provided by the internet user, the present system analyzes the intrinsic traits of computer and the internet users, links to various the traits to individual internet users, thus enables merchants and website operators to take actions directly on a user rather than on the user's inputs and/or extrinsic information about the user.

The system assigns different weight to each fingerprint in calculating the uniqueness of respective users and their relations. Parameters are the collection of all collectible data about a user, including but not limited to its username, password, email, address, phone number, mobile phone number, browser attributes, computer hardware id, IP address, etc. Fingerprints are the subset of unique or indicative parameters indexed to identify a computer and a user. Any parameters that users enter by themselves are considered non-unique but some of them are still indicative enough to be indexed into the fingerprint database, such as a password, email address, browser ip address etc. Most parameters generated by the computer software and/or hardware are indexed as fingerprints as they are unique and mostly beyond the user's control, these include browser cookie, computer hardware id, computer ip address etc. Each fingerprint is assigned different weight for calculating its degree of uniqueness to a computer and/or computer user. For exemplary purpose, a computer hard disk drive ID is given much more weight than a browser IP address, because a hard disk contains all the programs and data of a computer user so it almost equal to a unique computer and a unique user; in contrast, a browser IP can be frequently changed either due to the access network or due to the intentional use of proxy server or VPN server of a user, therefore it is much less indicative of a unique computer and/or unique user. By assigning weight to each fingerprint the system provides a technique to compute the relation of multiple users each contain at least one string of same fingerprint. The calculation can accurately determine if the seemingly multiple users are actually just one user or more, and the calculation method can be optimized with more information collected by the website operator. More details about assigning weight to each fingerprint and calculate the user identification will be provided in the following paragraphs.

One aspect of the system further assigns trust ranking to each user ID by parsing the parameters and cross checking the information contained in them. Some parameters contain information about the user's geographic location, time zone, language spoken, online proxy setting etc. The information can be parsed by querying the respective, external database, and cross checked with information retrieved by user inputs and or parsed from other parameters. A trust ranking will be assigned to a user depending on the result of cross check, better ranking is the result of better consistency of information. A user who enters his/her address as California, United States, with a California phone number, and browser IP address of California, computer IP address the same as browser IP, computer time zone as Pacific Time UTC-8, computer system language as English, is highly likely a genuine user, therefore a higher trust ranking is assigned. A user with the same set of information except that the browser IP address belongs to a public proxy server in California, the computer IP is a different one located in New York, and computer time zone is Eastern Time UTC-5, is assigned a lower trust ranking due to the lack of consistency of information entered and information revealed by the present system. Similarly, a user who enters his address of USA but uses a public proxy server in Germany to browse internet, with his computer IP address in Morocco, will be assigned a much lower trust ranking.

Advantages of the preferred embodiments may include one or more of the following. The system reliably authenticates on-line activities and trace users through various information average merchants can collect on the internet. The system can trace online actions to a computer, to track online behaviors to an individual internet user. Traceability to the computers and individuals operating them, once established, not only means accountability, but also means the ability to prevent unwanted actions such as unwanted payments from happening, thus minimize the loss and exposure to risk.

In broader sense, being able to identify users on the internet can bring great effectiveness to foster wanted activities such as real name registration and prevent unwanted activities such as fraudulent clicks, fraudulent actions (downloads, registrations, payment) etc. Taking click fraud as an example: in the online advertising business, one common business model is that a publisher charges an advertiser a fee upon a mouse click on the advertiser's advert. Driven by either profit or hurting competition, combined with the ease to generate a click, some robot software are developed to automatically generate clicks on target adverts on targeted publishers. These robot software are hosted in a number of computers, due to the lack of ability to track and identify these computers, the advertisers and publishers who suffer from the invalid clicks have no way to block these clicks from their sources. The best they can hope is to receive all clicks in the first place, and try to sort out which clicks are valid and which are not, after the fact, which requires significant administrative work on reconciliation both technically and financially.

BRIEF DESCRIPTION OF DRAWINGS

FIGS. 3A-3B show an illustrative queue of parameters of an internet user and an illustrative queue of fingerprints of an internet user.

FIG. 4 is an exemplary process for comparing a user identification database with strings of fingerprints.

FIG. 5 is a diagram of computing relations of users with matched strings of fingerprints.

FIG. 6 is an exemplary diagram illustrating multiple websites accessing a central database of user ID to retrieve information about a user.

DESCRIPTION

Figure 1:
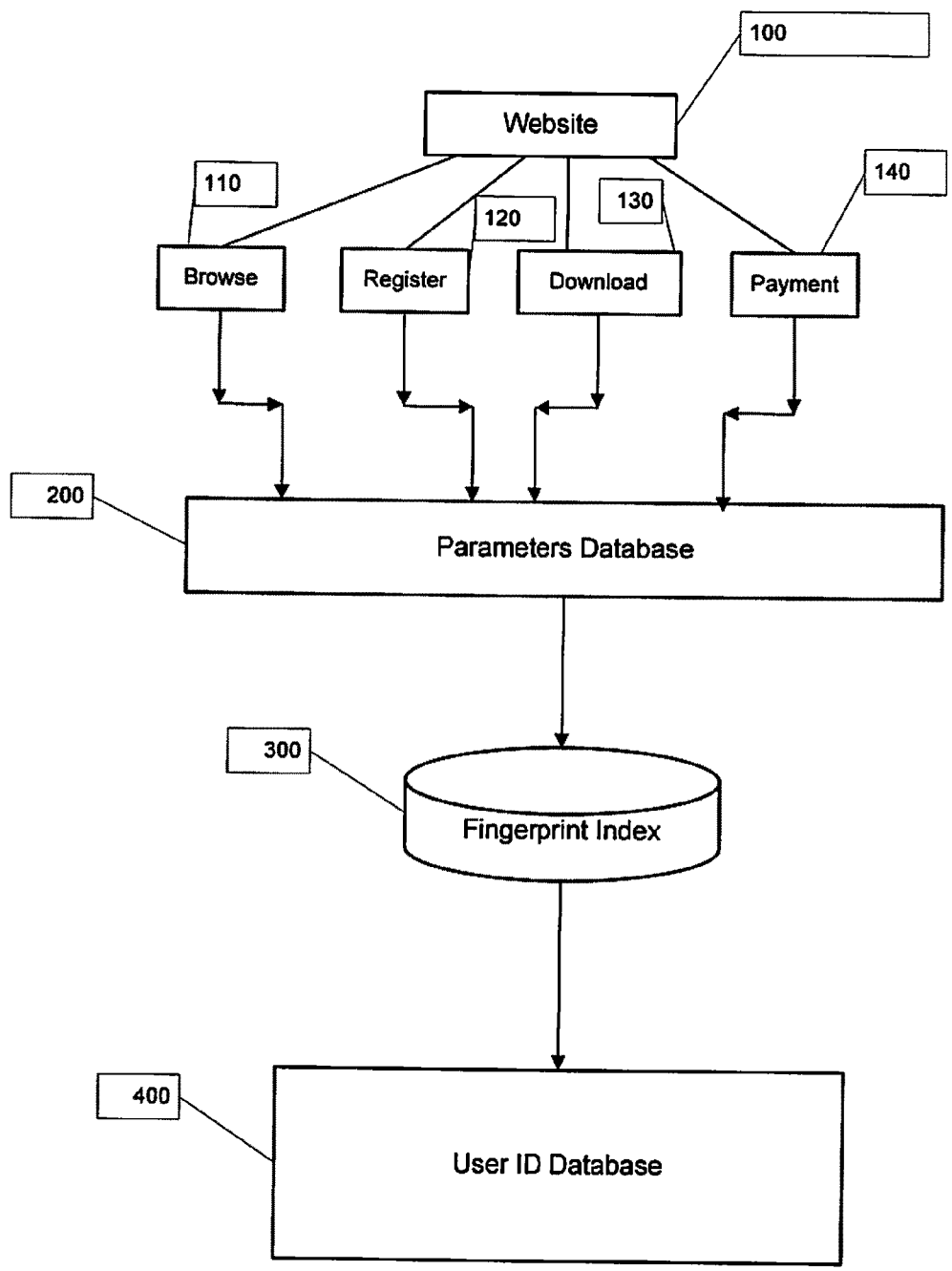
FIG. 1 shows an exemplary diagram of a system for collecting parameters, indexing fingerprints, and establishing a user identification database.

FIG. 1 shows an exemplary diagram of a system for collecting parameters, indexing fingerprints, and establishing a user identification database. FIG. 1 shows a website 100 that provides contents 110 for its visitors to browse, content/software 130 to download, accounts 120 to register or create, and product/service 140 to purchase online. The website 100 has logs of its visitors and their activities. These logs can be archived in database and indexed to establish user identifications as revealed by this system. When users browse the contents, the website can capture logs of the web browser used by the visitors, such as the browser's internet protocol address (IP), browser cookies, browser types (Internet Explore, Mozilla Firefox, Opera, Safari etc.), browser version numbers, and certain system information of the users' computers. For example, the information includes the local time setting, system language setting, among others, of the computers. When users download the software provide by the website 100, the downloaded software can detect the hardware ID of the computer it runs on, and can report the ID to the website. The hardware information can include the central processing unit, motherboard, hard disk drive, network card, among others. The website can require users to create accounts in order to receive certain services, and such registrations can capture the user name, password, email address, contact phone number, physical address, among others. Furthermore, if the website sells items to its users, users need to enter financial information such as credit cards, paypal accounts, among others, to proceed with their purchases.

The exemplary parameters that relate to a website visitor can be stored in a parameters database 200 such as a relational database with the following exemplary format:

Visitor i, parameter (ij), i=1-N, j=1-M; such as
Visitor 1, parameter11, parameter12, parameter13, . . .
Visitor 2, parameter21, parameter22, parameter23, . . .
Visitor3, parameter31, parameter32, parameter33 . . .
. . .

In this example, each parameter is represented by a data string such as a browser cookie, a password, an email address, or hardware ID, or system language symbol, or local time setting etc., it can be also empty (null) in which case there is no parameter collected for that position. Block 200 in FIG. 1 illustrates the database of user's parameters collected through related user activities on a website. The relation of a visitor and its parameters can be determined by a cookie session of the web server, browser's IP address, or other identifiable trait, after that, all the input this visitor has entered will be attributed to him/her, this include the username, password, email address, physical address, phone number, hardware ID, credit card information etc.

In this embodiment, certain parameters such as the index of a visitor's fingerprints are used to set up a fingerprint database 300. Alternatively, the system can use all parameters as indices to a visitor's fingerprints. The set of parameters are unique, or nearly unique that can be attributed to a unique person, and this set of parameters is listed as the user's fingerprint. These parameters can be a verified email address, verified phone number, a strong password, browser cookie, and hardware ID that are unique belongings to a user, thus the fingerprint database is built on these unique parameters.

User i, fingerprint (ij), i=1-N, j=1-M,
User 1, fingerprint11, fingerprint12, fingerprint13 . . .
User2, fingerprint21, fingerprint22, fingerprint23 . . .
User3, fingerprint31, fingerprint32, fingerprint33 . . .
. . .

Each fingerprint is a data string of its correspondent parameters, such as an email, a password, a hardware id string, and/or verified phone number, among others. The value of a fingerprint can be empty (null) to reflect the fact that the fingerprint isn't collected during the user's online activities. The result is stored in a user ID database 400.

The system of FIG. 1 is one embodiment of how a user identification database can be established. Although the system does not have access to the biological ID and biological fingerprint of a user, the system can collect the user's online parameters, and some are as unique as fingerprints, and utilize these unique parameters to identify an online user. Therefore, when 2 sets of fingerprints are identical or nearly identical, the system can detect that they are from the same user.

Figure 2:
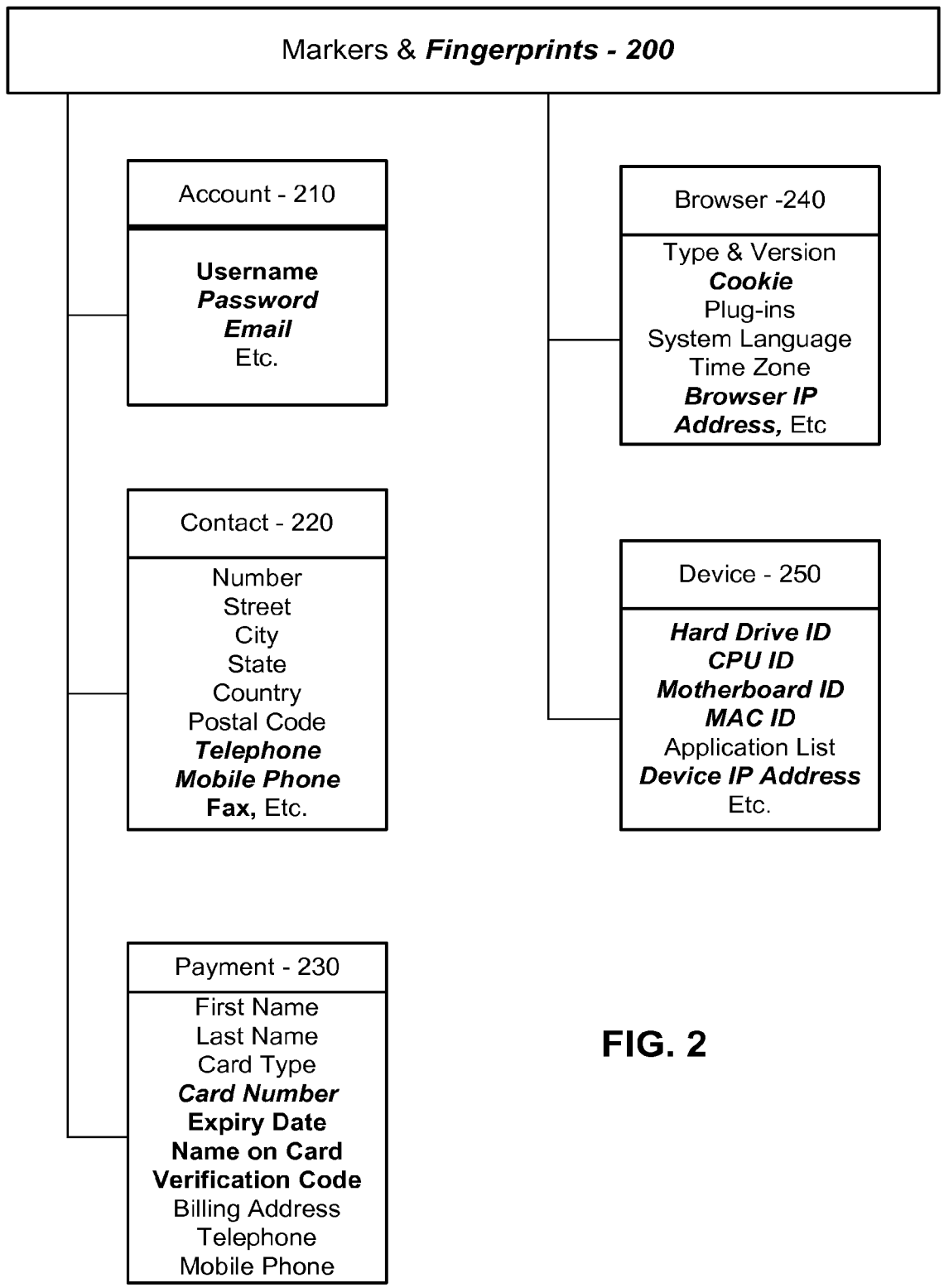
FIG. 2 is an exemplary diagram of a database to store composition of parameters and fingerprints of internet users.

FIG. 2 is a diagram illustrating the composition of parameters and fingerprints. Basically any traces a website can capture about a user can be indexed as parameters. This includes but is not limited to the browser parameters, account parameters, contact parameters, device parameters, and payment parameters. Block 210 illustrates account parameters that users will typically create with a website. These are usernames, passwords, email address, etc. The username is usually not unique when it is short and takes common names like "John", "JohnX" etc., but it can be unique when it is lengthy and takes a unique combination of alphabets and numbers, this is typically seen in the larger networks when short usernames are all taken. The password is another important parameter, it will be not be unique when a short password is created, but it can be unique when it is lengthy and takes a unique combination of alphabets and numbers. A website can dictate the minimum length of the password, as one embodiment of judging the uniqueness of the password, if the minimum length passes a threshold such as 8-digits, the password is deemed unique, other variations of criteria can be applied to judge the uniqueness of a password. The email address is not unique parameter if it isn't verified, however, when it is verified, it becomes a strong link to a user who own that email address. Therefore all username, password, and email address go into the index of online fingerprints as bolded in block 210. Email verification is a process of making sure the user owns the email s/he enters, it is typically done by sending a link to the email address, if the user can click on the link, it is an indication that the user does own the email address s/he claims as hers/his.

Although a website will require a unique username and a unique email address to be registered with the single website, which means one person can not register two accounts with the same username and email address within one website; one person can register multiple accounts across multiple websites, all using his/her favorite username, email address, and passwords. When the user ID database receives such entries from multiple, different websites, these entries are very indicative of whether they are created by one person or by many different persons. This match can be used by the system of FIG. 1 to create the fingerprint.

Block 220 illustrates the contact information a user typically enters into a website upon request. It includes the first name, last name, location—street, city, state/provide, country, postal code, telephone number, mobile phone number, fax number etc. These parameters of a user and can be indexed into fingerprints when they are verified. Similar to email verification, the verification can be initiating a phone call or sending a fax to the number with a pass code, and the human who answers the phone shall key in the pass code correctly to complete the verification process, in case of faxing, the receiving party should fax back the pass code received.

Block 230 illustrates potential financial information a user enters in the event that s/he purchases items from a website. Aside from the regular entries like address, phone number, the most important and unique entries are credit card number, expiry date, name on card, verification code. Therefore all these unique entries will go to the fingerprint index as bolded in block 230. Other parameters in block 230 should be archived and indexed as parameters, for the purpose of proper analysis. Although the name, address, phone number etc. can be repetitive with the information entered in other blocks, a full-parameters index will enable the system to compare these entries and evaluate their consistency. Based on the consistency evaluation, the system can assign trust rank to a user per the method revealed by this system.

In Block 240, browser parameters are captured. Such information comes from the internet browser program, such as the browser type, version number, major plug-in programs like Flash media player, browser cookies, browser IP address, computer local time, system language, among others. The information is revealed by the browser program when it connects to a web server, so the website can index these parameters for the purpose of identifying users. Although most of the browser parameters are not unique, e.g. different users can have the same parameters, for example, they all use a popular internet browser and its most updated version, browser cookie and browser IP can be unique. A browser cookie is a small piece of information sent by a web server to a web browser to be stored for future use. The data in the browser cookie will be sent back to the web server whenever the browser reconnects to the website. Cookies are commonly used to store user preference information, such as website options. Cookies are also used to store shopping card contents. Because cookies are issued to a browser by the website, it can be made unique. Browser IP can be unique when users connect the web directly from its ISP, which most users do. It may not be unique if users connect the web through a third party proxy server. There are many open proxy services that are available to the public. However, by indexing these public server IP addresses and checking if the browser IP falls into the public proxy IP pool, the system can determine the degree of uniqueness of the browser IP information. Both browser cookie and browser IP are highlighted in block 240 of FIG. 2 to reflect that they are treated as unique parameters and thus are indexed for fingerprint database.

Block 250 illustrates the device information a website can acquire from a user, with the help of a client software that to be downloaded in user's computer. The client software can detect the serial number of the computer CPU, motherboard, hard disk drive, and MAC address of network card. It can also detect the computer's local IP address assigned by its ISP, which can be different if the user connects the web browser through a public proxy servers to hide his/her computer IP address. Due to the fact that hardware IDs are lengthy strings and are seldom repetitive, and computer intrinsic IP address is the source IP assigned by its ISP, they are saved in the index of fingerprints that help effectively identify the users.

FIGS. 3A-3B show an illustrative set of parameters of an internet user and an illustrative queue of fingerprints of an internet user. The queue of fingerprints is a subset of the queue of parameters since parameters can be comprehensive and fingerprints are unique.

FIG. 4 is a diagram illustrating the establishment of user id with the index of online fingerprints. First, a new set of fingerprints is obtained (300). Next, the fingerprints are scanned and compared to existing fingerprints (310). Matches are determined (320). If a match occurs, the system reports the match (340) and otherwise the system inserts and generates a user ID (330). From 330 or 340, the system loops back to process the next user.

A unique serial number is assigned to a user with a unique set of online fingerprints—unique username, unique password, unique email account, unique phone number, unique fax number, unique mobile phone, unique browser IP address, unique browser cookie, unique credit card number, unique CPU serial number, unique motherboard serial number, unique network card serial number, unique hard disk serial number, unique computer's direct IP address. When a new set of fingerprints are collected, the system compares each string to existing entries. If there is no single match found on any string, the system will assign a new serial number to the user who carries this unique set of online fingerprints, thus establish a new user id in the database. The process is repeated to create new user id in the database whenever a new set of online fingerprints is collected. If the new entry matches the existing entry in the user id database, the system labels the two sets of data as belonging to the same user, and continues with the next entry.

FIG. 5 is a diagram illustrating the method to evaluate the relationships of two user IDs that have at least one fingerprint string in common. Sometimes they are analyzed as one user, sometimes they are analyzed as a group of users that are closely related, sometimes they are analyzed as separate users without distance relation. According to one embodiment of the present method of computing relations of users, different fingerprints are weighted differently and the source websites that collect the fingerprints are also weighted.

Turning now to FIG. 5, the process identifies two sets of fingerprints that have matched strings (510). Next, the positions of matched strings are marked (520). The process assigns a score to each position according to a uniqueness evaluation (530). The relationship of two user IDs can then be determined (540).

In one embodiment, the process applies the following evaluations:

$P_i=(1,0)$; i=1-N
$P_i$ corresponds to the value assigned according to the comparison of strings at each position.
1=not match
0=match $\alpha_i$
N is the number of data positions in the queue the fingerprints stored in.
$B_i=(1,0)$; i=1-N
$B_i$ is an constant in the interval [0,1] assigned to each position according to the comparison of source websites that send the fingerprint, including the value of 0 and 1 depending on the evaluation of uniqueness of the position.

$$M=[(\alpha_1 \times B_1)+P_1] \times [(\alpha_2 \times B_2)]+P_2 \times \ldots \times [(\alpha_n \times B_n)+P_n]$$

$\alpha_1$ is a constant in the interval [0,1] that is assigned to each position based on the pre-determined uniqueness evaluation.

The above embodiment considers the position of the match, the source of match (from different websites or from inside one website), and the factor of uniqueness evaluation. If M=0, we conclude that the two strings represent the same person, if M≠0, the system concludes that the two fingerprint strings represent two different persons. The closer the M is to 0, the more likelihood that the two users are closely related. In this embodiment, the match on any one position can result in the match of two strings, therefore gives each position the potential power of overwhelming other positions in concluding the same identify of two partially different strings. The system also considers the factor of whether the matched string being collected from the same or different websites or sources, to reflect the possibility that the same person can visit multiple website with at least some parameters being the same.

A new user ID can be established by calculating the probability of match with previous user IDs with this simple algorithm. When online activities are happening and being archived, online fingerprints can be captured and sent to compare with the existing users' fingerprints; if there is no match concluded, a new user ID will be generated with strings of fingerprints; if there is a match being concluded, the activities are deemed to be initiated by the same internet user in the database.

The above formula is just one of the many formulas to compute uniqueness of user ID based on matched strings. Anyone of ordinary skill in the art may figure out variations or alterations by reading this system. In order to further illustrate the method of computing user identity, consider the following two sets of exemplary strings collected from one source, e.g. one website:

| Username | Password | | | browser | |
|---|---|---|---|---|---|
| P1 | P2 | Email P3 | ... | ip P8 | ... hard disk drive serial # P12 |
| adam | boomer | craig@mail1.com | ... | 11.22.33.44 | ... WDC WD800BB-08JHC0-WD-WCAM9M 167858 |

-continued

| Username P1 | Password P2 | Email P3 | ... | browser ip P8 | ... | hard disk drive serial # P12 |
|---|---|---|---|---|---|---|
| ashley | booker | chris@mail2.com | ... | 11.22.33.44 | | WDC WD800BB-08JHC0-WD-WCAM9M 167858 |

Because there are a finite number of positions of fingerprint strings, the system can assign the value of $\alpha_i$, $B_i$, and $P_i$ to each position respectively, based on an evaluation of the position's indication of uniqueness. In the above example, browser IP (position 8) is a match, and hard disk drive serial number (position 12) is a match, therefore $P_8=0$; $P_{12}=0$. Other $P_i=1$ In a much simplified illustration, if
$B_i=0$, if the strings are collected from the different websites
$B_i=1$, if the strings are collected from the same website
As the above strings are from the same websites, $B_i=1$ Various methods of assigning values to $B_i$ are possible within the framework of this system. To define the value of $\alpha_i$, more scrutiny must be given to the meaning of each position. The more uniqueness a position indicates, the closer the $\alpha_i$ is to 0. For a much simplified illustration, in view of the above example, username, password, email address are be created by the users, although they reflect users' personal preference in creating these characters, they can be altered or even randomized, therefore we let $\alpha_1=1$, $\alpha_2=1$, $\alpha_3=1$. Most of the browser IP address are automatically set by the computer networking program in consistent with its ISP default settings, however, some advanced users can still manually set it different than the default setting, therefore we let $\alpha_8=0.5$. Now the hard disk serial number, this is serial number on a hard disk drive manufactured by the disk maker, therefore the system views it as a unique parameter and set the $\alpha_{12}=0$. Placing values into the formula, the system can calculate the identity:

$$M = [(\alpha_1 \times B_1) + P_1] \times [(\alpha_2 \times B_2) + P_2] \times ... \times [(\alpha_n \times N_n) + P_n]$$
$$= [(1 \times 1) + 1] \times [(1 \times 1) + 1] \times [(1 \times 1) + 1] \times ... \times$$
$$[(0.5 \times 1) + 0] \times [(0 \times 1) + 0]$$
$$= 0$$

M=0 means the two strings are generated by one internet user, only one ID should be created instead of two, and this user ID shall index all the usernames, passwords, email addresses this person used to create multiple accounts. Intuitively, the same person has created 2 separate accounts with separate pairs of username, password, email but from one computer and one internet browser setting.

Turning now to another simple illustrative case where the following two sets of fingerprint strings are collected from 2 different website:

| username | password | email | ... | browser ip | ... | hard disk drive serial # |
|---|---|---|---|---|---|---|
| adam | boomer | craig@mail1.com | ... | 11.22.33.44 | ... | WDC WD800BB-08JHC0-WD-WCAM9M 167858 |
| adamss | boomer | craig@mail1.com | ... | 12.34.56.78 | ... | WDC WD752CB-97HDF0-WD-WKYN3T5 48975 |

Now let's do a simple calculation based on the simplified, illustrative criteria into the formula.

$$M = [(\alpha_1 \times B_1) + P_1] \times [(\alpha_2 \times B_2) + P_2] \times ... \times [(\alpha_n \times B_n) + P_n]$$
$$= [(1 \times 0) + 1] \times [(1 \times 0) + 0] \times [(1 \times 0) + 0] \times ... \times$$
$$[(0.5 \times 0) + 1] \times [(0 \times 0) + 1]$$
$$= 0$$

Note that the person used different computers to register different accounts on different websites, but the person used the same email address, create the same password string, which, according to the simplified calculation, results in 0 in both position 2 and 3, thus making the total calculation to be 0.

Intuitively, the same person uses the same email to register 2 accounts at 2 different websites, using the same browser but with different IP address and different computers (different hard disk serial number). The person didn't register the same username, probably because the username was already taken on the second website so s/he has to make small variations of her/his favorite username. The different IP addresses may come from the different assignments by the ISP, typically see in ADSL networks that assign different IP address each time the person login. The different computers may be one at home, one in office, or one desktop or one laptop the person use differently when creating the accounts.

There are definite number of fingerprint strings and their respective positions, we can thoroughly evaluate each string/position, combined with the source of the collection, and assign values of $\alpha_i$, $B_i$, $P_i$ for accurate assessment of the relations of users with partially matched fingerprints. The above embodiments are much simplified iterations to embody the calculation of unique user identity, in practice, more subtle and comprehensive mathematical methods are used to calculate the uniqueness, and further calculate the relation of users in the event the result is close to a match but isn't a perfect match (0). In the event of a close relation being identified, all related users are labeled into one group for further monitoring. Although the method is not intended to biologically identify any anonymous users on the internet, it can successful identify the behaviors conducted by the same user across the web, and provide enough tracking information that can be further linked towards his biology ID by authorities.

FIG. 5 can also determine the relationship of multiple users who have at least one matched strings of fingerprints but they are not concluded the same person. According to the above illustration, if M=0, two users are concluded to be the same person, the relationship is straight and simple. But when M≠0, while some strings of fingerprints are shared by two or multiple users, the system can further calculate whether the users are related, or it's just a coincidence for them to share one or more fingerprint strings. In general, the closer the M is to 0, the more the users are related. One way of calculating the relation is to compute the value of M divided by the aggregate of $P_i$ $$R_{a,b} = \frac{M_{a,b}}{\Sigma P_{i,j}}$$

$R_{a,b}$ is the relation of two users a with b.

$M_{a,b}$ is the calculation of match between users a and user b.

$\Sigma P_{i,j}$ is the sum of position values of user a (i) and user b (j)

When $R_{a,b} \leq \beta$, we can conclude that user a and user b as related users and group them into one group of related users, otherwise we will define them as separate, non-related users.

β is a value pre-determined by probability evaluation of related versus non-related users.

Consistent with the present system, several ways exist to alter or optimize the computation of relation of multiple users for various purposes. For example, the system can adjust the weight of each position by adjusting its α, B, P to emphasize the importance of any single position in determining the relations of multiple users. For example, if a lengthy and unique password string is shared by multiple users across different geographic locations, although they use different accounts, different emails, different browser attributes, and different computers, the system may still view them as one group that may collaborate to do something on the internet. If a phone number is shared by multiple users on websites that use the phone number to authenticate the user, the system can view these users to be related even if they have different account credentials. Another example of modification can be just building a relational database to tag all users who share any string instead of determining the relations after a threshold is crossed, like the formula above. This way the relations are broadly defined which enables the traceability of every user who share any fingerprint string with others.

One important application and embodiment of the present system is to enhance the effectiveness and accuracy in detecting and preventing online frauds, including spamming, phishing, Trojan horse, identity theft, and particularly fraudulent payments that take place across the worldwide web. As illustrated in FIG. 6, the user ID database can be connected locally or remotely with many websites that offers products or service online. Every time any website collects any strings of user parameters or fingerprints, it sends to the user ID database for computing. If there is no match of any existing user being concluded, a new user ID will be established with all the parameters including fingerprints indexed; if a match is concluded, any new parameters found in this entry will be indexed under the existing matched user ID. Inside the user ID database, we can label any user who is reported by the participating websites to have bad history involving in fraudulent activities, in this case all the strings attached to the user ID will be labeled too, once the new entry of user strings comes in, it will be compared with the existing entries. When a match is concluded, the new entry will be labeled as the same bad user. Thereafter a message can be returned to the website to instruct the website to block the user's further activities including blocking the online payment, as most probably, the person is using a stolen credit card or financial account to pay the service, if not blocked, a chargeback will later come the way to the merchant operating the website. It is particularly effective when a large number of websites join the network, after a fraudster successfully defraud one website and be labeled, the same person will have almost no chance to defraud another website as all the information about the person is labeled in the central user ID database, regardless how many stolen credit card the person still possesses, since it is almost impossible or not practical for the same person to eliminate all the parameters.

While the current fraud detecting method is either verifying the user information or user address, which can be easily beaten when the fraudster possess the complete information of the card owner as a result of hacking into the credit card database; or comparing the current purchase with the cardholder's past spending mode, which is very vague and almost useless when the current purchase is within a certain value, say, within a couple of hundred dollars. The present system introduces a new method that directly captures the parameters of the fraudster, thus directly track down to the person who conduct the fraud. Whenever the same parameters, wholly or partially, are found again, we immediately know they are from the same person, or a related group of persons, therefore to instruct the websites to disapprove the transaction or immediately refund the payment and block the account.

One exemplary application of the system is to link certain activities to internet users that are known to be bad or fraudulent users. The system can prevent such users from repeatedly defrauding websites. This will require the websites 600 to visit one central database 610 of information about user ID and fingerprints. The process supporting the system of FIG. 6 is discussed in more detail in FIG. 7.

Another important application of the present system is to assign trust ranking to a user ID by parsing and analyzing the parameters collected. Many parameters can be reverse looked up and retrieve geographic information like city, state/province, country, area code, time zone, etc. The information can be checked with the information the user enters about itself, the information can be also cross checked with each other.

Figure 7:
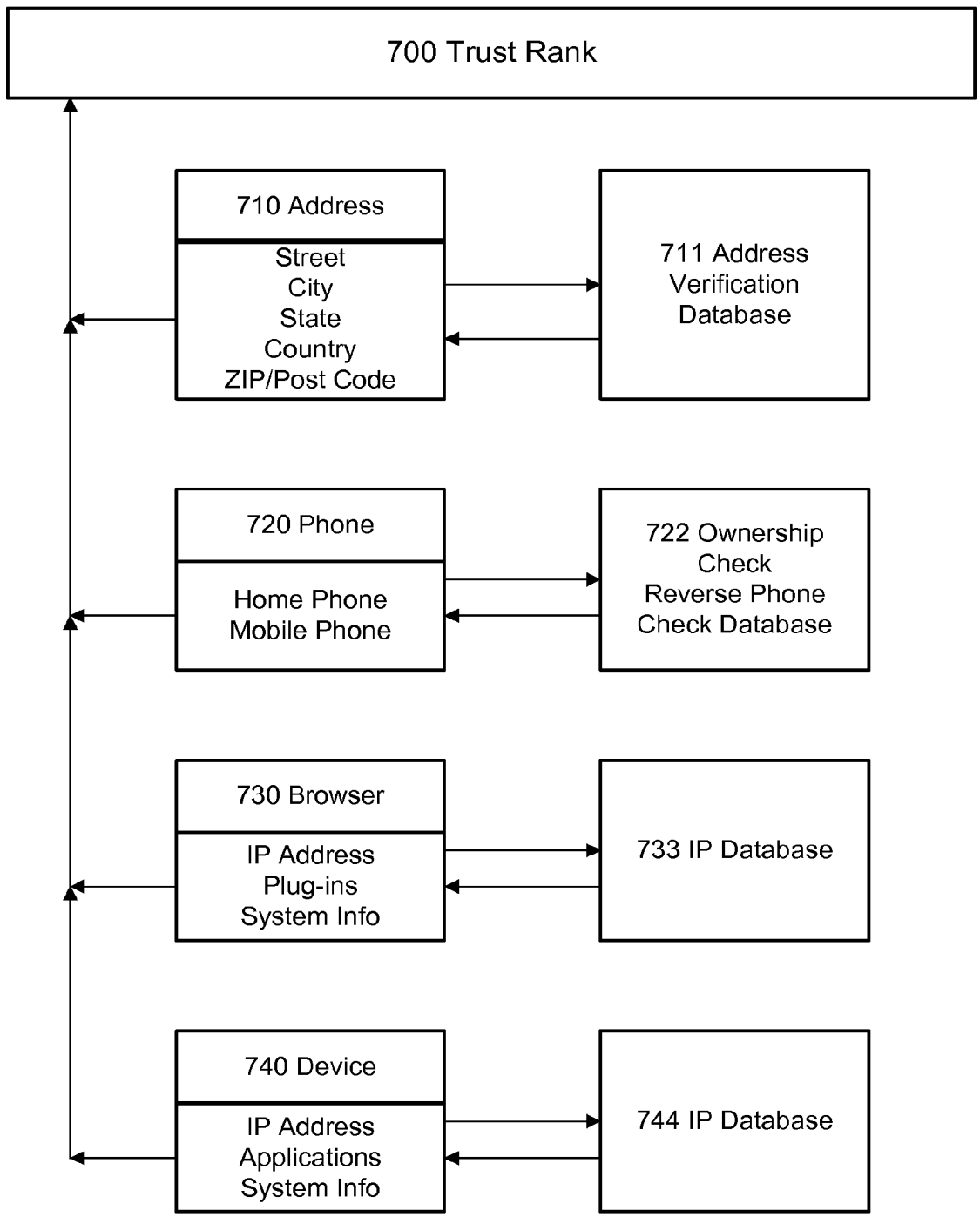
FIG. 7 is an exemplary diagram of a process for computing trust ranking to user identification.

FIG. 7 is a diagram that illustrates how to assign trust rank to a user ID according to the result of cross checking the parameters. The higher the consistency and integrity the cross check reveal, the higher the trust rank can be assigned to a user. In one particular application of the trust rank, users with different trust ranks are given different privilege for their online purchases, e.g. higher ranking users can purchase more at a time.

The system of FIG. 7 has an address block 710 that communicates with an address verification database 711, a phone block 720 that communicates with a reverse phone check database 722, a browser block 730 that communicates with an IP database 733, and a device block 740 that communicates with an IP database 744.

Block 710 verifies the existence of the address. When the user enters an address, the system queries an external address database. If the address exists, we can add a score to the trust rank of this user ID. If the address does not exist, it is likely the user faked it or he simply made an error, regardless, we will deduct a score from its trust rank. Block 720 illustrates a process to verify a user's phone number. The system can query a phone directory database such as yellow page, and verify if the phone number exists. If it exists, one more score, otherwise one less. Then the system further look up a reverse phone system to retrieve the address information related to this phone number, the city, state/province, country etc. If the information matches the address information entered by the user, the system adds score to the trust rank. If not, the system deducts scores from the trust rank. Block 730 illustrates a process to check a user's internet browser IP address. Once a browser IP is obtained, the system will query a IP database to retrieve the geographic information related to this IP, including the city, state/province, country, time zone, Internet Service Provider, net speed etc. The geographic information can be compared with the user's self entered information, and that the phone number revealed. If all the information matches with each other, a high score is assigned to the trust rank, otherwise scores will be deducted from the trust rank.

Block 740 illustrates a process to check a user's direct IP address used by the computer: it can be the same or different from the IP used by the internet browser. Once a computer IP is obtained, the system will compare the IP address with its browser IP. If they match, a higher rank is assigned, and if they do not match, a lower rank is given. Also the system will query a IP database to retrieve the geographic information related to this IP, such as city, state/province, country, time zone, Internet Service Provider, net speed, network type etc., and compare the geo information with the user's self-entered geographic information for consistency. Higher trust rank is given in the event of consistency, while a lower trust rank is a result of inconsistency. Inconsistency, wherever it is detected, is indicative of information manipulation by the user. For example, a user computer's direct IP address reveals he is located in Ghana, Africa, but his browser IP is in United States, a further lookup shows this is a public proxy server in USA that anybody can use for anonymity; and he enters an address in United States but in different state than the proxy IP is located, and the phone number is again located in different state than his self-addressed state, these multiple sets of very inconsistent information will result in very low trust rank according to the computation of the present system. As a result, such a user shall be denied from any online transaction or at least denied from any large item transaction and/or frequent transactions in any time period. Intuitively, it is likely that the user is living in Ghana but pretends to be a user of United States. When he attempts to buy anything on the internet, he probably does not want to be found he is in Ghana, Africa, and he is likely use a stolen credit card to for online purchase,—if he intends to purchase anything. Per the present system, the user has been already flagged due to the inconsistency before he attempts to do anything online, therefore this method is highly preventive.

The trust rank is a very powerful tool for a single website that isn't connected to any central user ID database. Because all the information can be collected by the single site, and then analyzed and cross checked by the site independently. Inconsistency will lower the trust rank which indicates higher risk if the user attempts to make an online transaction and/or payment. Therefore, without any external user ID database to visit, the single website alone can flag the user and stop any transaction by this user.

Although the above description contains many specifics for the purpose of illustration, those skilled in the art can make many variations and alterations within the scope of this system. Also, the following details describe specific embodiment of the system, they do not constitute any limitation to the generality of the system.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the merchant web site 130 is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer). Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to identify an individual operating a remote computer, comprising:
   a. identifying one or more intrinsic traits of the remote computer and the individual when a web site operator receives an inquiry from the individual visiting a web site using the remote computer,
   b. treating a device and account information as one whole set of entry, and establishing an identification (ID), wherein the next time a new set of entry is received, establishing another ID, and then determining a relationship of the IDs:
   c. linking the intrinsic traits to the individual for authentication instead of relying on the individual's representation for authentication or extrinsic information about the individual; and
   d. generating a fingerprint of the computer and the individual, wherein the fingerprint of the computer or individual is represented as a string, further comprising determining a relationship M between users and computers as:

$$M=[(\alpha_1 \times B_1)+P_1] \times [(\alpha_2 \times B_2)+P_2] \times \ldots \times [(\alpha_n \times B_n)+P_n],$$

where $\alpha_i$ and $B_i$ are constants and $\alpha_i$ is between 0 and 1, and B is a constant assigned to each parameter depending on its degree of uniqueness; and $P_i$ is a comparison of the fingerprint based on each string position $P_i=(1,0)$;

i=1-N and $P_i$ corresponds to the value assigned according to the comparison of strings at each position and where P=0 if a match exists with $\alpha_i$ and otherwise P=1.

2. The method of claim 1, comprising deriving the intrinsic traits from parameters generated by the remote computer software and/or hardware substantially beyond the individual's control, including a browser cookie, a computer hardware identification, and computer internet protocol address.

3. The method of claim 1, comprising determining a trust ranking to a user based on a consistency of information collected from the user's actions.

4. The method of claim 1, comprising generating a database of unique user identification based on a set of fingerprints.

5. The method of claim 1, comprising linking a fingerprint from user actions to a user.

6. The method of claim 1, comprising assigning a different weight to each fingerprint in determining uniqueness of the individual.

7. The method of claim 1, comprising assigning a different weight to each fingerprint in determining uniqueness of the remote computer.

8. The method of claim 1, comprising determining the relationship of multiple individuals, each containing the same fingerprint.

9. The method of claim 1, comprising assigning a trust ranking to each individual by parsing parameters and cross checking information contained in the parameters.

10. The method of claim 1, comprising querying an external database, and cross checking with information from user inputs and or parsed from one or more parameters.

11. The method of claim 1, comprising assigned a low trust ranking if information entered by the individual differs from the fingerprint for the individual.

12. The method of claim 1, wherein the fingerprint is encrypted.

13. The method of claim 1, wherein the fingerprint of the computer or individual comprises a string.

14. The method of claim 1, comprising determining relationship as:

$$R_{a,b} = \frac{M_{a,b}}{\sum P_{i,j}}$$

$R_{a,b}$ is a relationship between two users a and b;

$M_{a,b}$ represents a match between users a and b; and $\sum P_{i,j}$ represents a sum of position values of user a (i) and user b (j).

15. The method of claim 1, comprising storing the fingerprints in a central database.

16. The method of claim 15, wherein each website accesses the central database to identify multi-site fraudsters.

17. The method of claim 1, comprising generating the trust ranking by verifying an address, a telephone number, a browser system information, and a device hardware information.

* * * * *